United States Patent [19]
Wheeler

[11] 3,885,802
[45] May 27, 1975

[54] PACKING MEMBER FOR AUTOMOBILE LIFT

[76] Inventor: John H. Wheeler, 3921 Marquette St., Dallas, Tex. 75225

[22] Filed: Oct. 4, 1973

[21] Appl. No.: 403,527

[52] U.S. Cl.................................. 277/212; 277/215
[51] Int. Cl............................................. F16j 15/32
[58] Field of Search......... 277/212, 212 F, 215, 214

[56] References Cited
UNITED STATES PATENTS

| | | | |
|---|---|---|---|
| 1,712,603 | 5/1929 | Christenson | 277/215 |
| 2,149,147 | 2/1939 | Peterson et al. | 277/212 F |
| 2,310,405 | 2/1943 | Dodge | 277/212 F |

Primary Examiner—Robert I. Smith
Attorney, Agent, or Firm—Richards, Harris & Medlock

[57] ABSTRACT

A packing member comprises an annular body of elastomeric material having a substantially radially disposed top wall and a substantially axially disposed outer wall. A bottom wall includes a substantially radially disposed outer portion and an inner portion extending angularly downwardly from the inner edge of the outer portion. An inner wall extends angularly downwardly and inwardly from the top wall to the inner portion of the bottom wall for cooperation with the inner portion of the bottom wall to define an angularly downwardly and inwardly extending sealing lip. A plurality of equal diameter, axially extending holes are formed in the packing member at spaced points around the inner portion of the bottom wall and are separated from each other by a distance equal to about one diameter. The holes extend into the packing member to a depth equal to about one-half the distance between the top wall and the bottom wall and function to permit the sealing lip to distribute itself more uniformly as the packing member is used, and thereby form a more effective seal. The holes further prevent stress concentrations in the packing member to reduce wear and permit the packing member to act as a radial spring, thereby accommodating eccentricities in the component parts of structure sealed by the packing member.

10 Claims, 4 Drawing Figures

PACKING MEMBER FOR AUTOMOBILE LIFT

BACKGROUND AND SUMMARY OF THE INVENTION

This invention relates to a novel packing member which is particularly adapted for use in connection with automobile lifts and similar hydraulic cylinders.

In U.S. Pat. No. 3,627,335 granted to Applicant on Dec. 14, 1971, for PACKING MEMBER, there is disclosed various improvements both to read seals and to piston seals. Various embodiments of the invention disclosed and claimed in Applicant's prior Patent utilize holes extending axially into the seal at spaced points around the high pressure side thereof. This construction provides numerous advantages in the use of the packing member. For example, the holes permit the material of the packing member to distribute itself more uniformly, thereby causing the packing member to form a more effective seal. The holes also reduce stress concentrations in the packing member and thereby reduce wear. Finally, the holes permit the packing member to act as a radial spring and thereby accommodate certain eccentricities between the component parts which are sealed by the packing member.

The present invention comprises a further improvement in the art whereby the advantages of Applicant's prior invention relating to rod seals and piston seals are achieved in a packing member for automobile lifts, elevators, and the like. In accordance with the broader aspects of the invention, a packing member comprises an annular body formed from an elastomeric material and having a generally rectangular cross section. A sealing lip extends angularly downwardly and inwardly from the annular body for engagement with the piston rod of a hydraulic cylinder. A plurality of axially extending holes are formed in the sealing lip from the bottom side thereof. The holes are all substantially equal in diameter and are separated from one another by a distance of about one diameter.

In accordance with more specific aspects of the invention, the annular body of elastomeric material includes a radially extending top wall and an axially extending outer wall. A bottom wall includes a radially extending outer portion and an inner portion extending angularly downwardly from the inner edge of the outer portion. An inner wall extends angularly downwardly and inwardly from the top wall to the inner edge of the inner portion of the bottom wall for cooperation with the inner portion of the bottom wall to define the sealing lip.

The packing member may further be provided with a layer of reinforcing material, In certain applications of the invention the layer of reinforcing material extends across the inner part of the top wall, across the entire length of the inner wall, across the entire width of the inner portion of the bottom wall, and across the inner part of the outer portion of the bottom wall. For high pressure applications the layer of reinforcing material may extend around the entire periphery of the annular body of elastomeric material.

DESCRIPTION OF THE DRAWINGS

A more complete understanding of the invention may be had by referring to the following Detailed Description when taken in conjunction with the accompanying Drawings, wherein.

DETAILED DESCRIPTION

Figure 2:
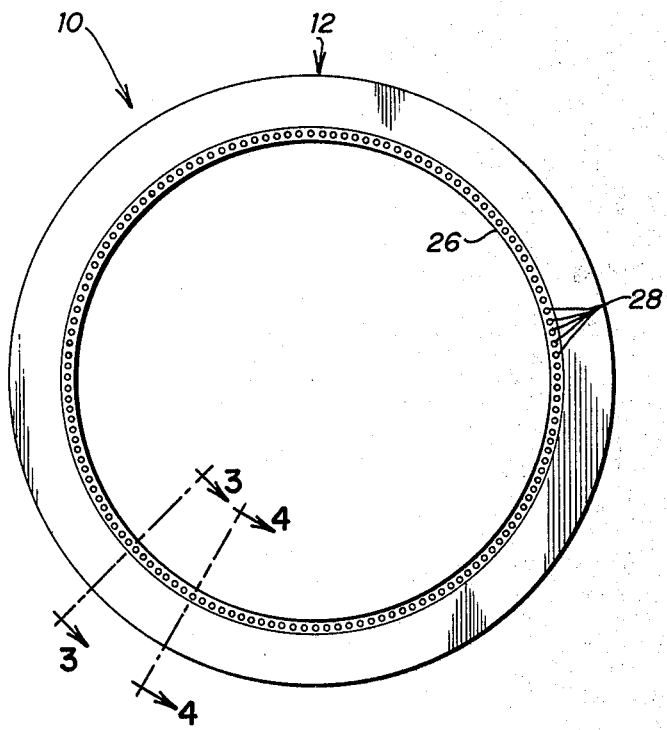
FIG. 2 is a bottom view of a packing member incorporating the invention.

Referring now to the Drawings, and particularly to FIG. 2 thereof, there is shown a packing member 10 incorporating the invention. The packing member 10 comprises an annular body 12 formed from an elastomeric material, such as natural rubber, synthetic rubber, plastic, etc. For example, typical materials which may be utilized in the practice of the invention include neoprene, viton, Buna-N, and urethane, it being understood that numerous other elastomeric materials may be utilized in the practice of the invention in order to meet the requirements of particular applications.

Figure 3:
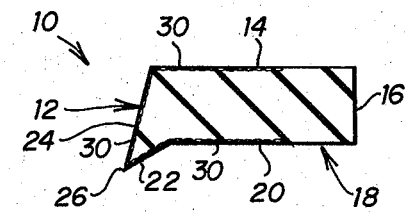
FIG. 3 is an enlarged sectional view taken generally along the line 3—3 in FIG. 2.
Figure 4:
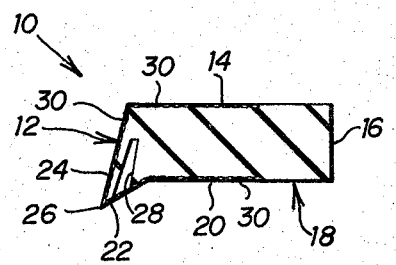
FIG. 4 is an enlarged sectional view taken generally along the line 4—4 in FIG. 2.

Referring now to FIGS. 3 and 4, the annular body 12 of the packing member 10 comprises a substantially radially extending top wall 14. A substantially axially extending outer wall 16 extends downwardly from the outer edge of the top wall 14 and substantially perpendicularly with respect to the top wall. A bottom wall 18 includes a substantially radially disposed outer portion 20 which extends inwardly from the lower edge of the outer wall 16 and substantially parallel to the top wall 14. The bottom wall 18 further includes an inner portion 22 which extends angularly downwardly from the inner edge of the outer portion 20. An inner wall 24 extends angularly downwardly and inwardly from the inner edge of the top wall 14 to the inner edge of the inner portion 22 of the bottom wall 18.

The inner wall 24 cooperates with the inner portion 22 of the bottom wall 18 to define an angularly downwardly and inwardly extending sealing lip 26. Referring particularly to FIGS. 2 and 4, a plurality of substantially axially extending holes 28 are formed in the annular body 12 at substantially equally spaced points around the inner portion 22 of the bottom wall 18. The holes 28 are all substantially equal in diameter and each hole is separated from the next hole by a distance equal to about one diameter. Each hole 28 has a depth equal to about one-half the distance between the top wall 14 and the bottom wall 18.

The holes 28 play several important functions in the operation of the packing member 10. First the holes 28 allow the elastomeric material comprising the annular body 12 to distribute itself more conformly as the packing member is used. This permits the packing member 10 to form a more effective seal. Second, the holes 28 reduce stress concentrations in the packing member 10 and thereby reduce wear of the packing member. Third, the holes 28 permit the packing member 10 to act as a radial spring. This permits the packing member to absorb a certain amount of eccentricity between the component parts of an automobile lift or similar hydraulic cylinder.

The packing member 10 may also be provided with a layer of reinforcing material 30. In the embodiment of the invention illustrated in the Drawings, the layer 30 extends across the inner part of the top wall 14, across the entire length of the inner wall 24, across the entire width of the inner portion 22 of the bottom wall 18, and across the inner part of the outer portion 20 of the bottom wall 18. For high pressure applications, the layer of reinforcing material 30 may extend around the entire periphery of the annular body 12. However, in embodiments of the invention in which the annular body 12 is formed from urethane, the layer of reinforcing material 30 is typically omitted.

The embodiment of the invention illustrated in the Drawings is fabricated by means of a strip of cotton duck which is calendared on both sides with uncured elastomeric material. A strip of this material cut to the desired shape is positioned within a mold, after which the mold is filled with a quantity of uncured elastomeric material. The mold is then simultaneously subjected to heat and pressure by means of which the elastomeric material is cured and the reinforcing material and the remainder of the annular body 12 are simultaneously vulcanized into a unitary structure.

Figure 1:
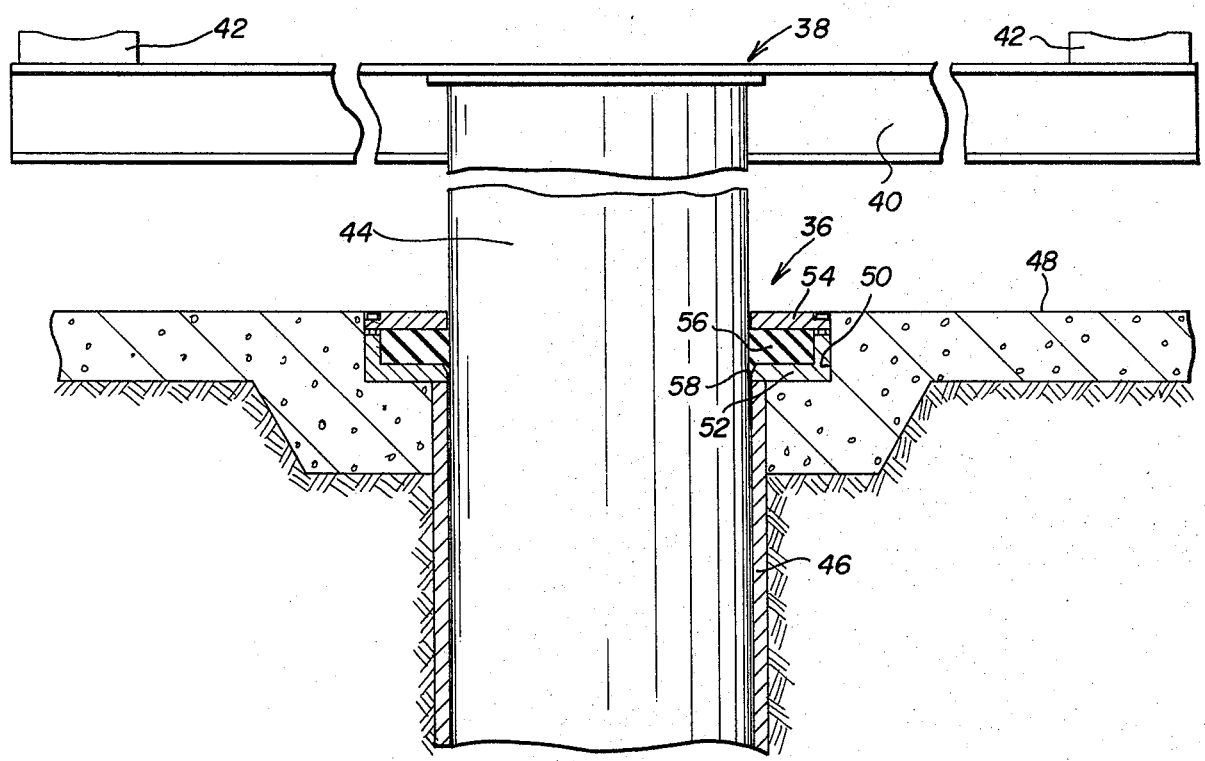
FIG. 1 is an illustration of an automobile lift structure showing the use of the invention.

Referring now to FIG. 1, an automobile lift structure 36 incorporating the invention is shown. The lift structure 36 includes an upper automobile receiving structure 38 including one or more cross beams 40 and channel members 42 mounted on the cross beams 40 to receive the tires of an automobile. The channel members 42 may be adjustably supported on the cross beams 40 so as to receive automobiles of various widths. Moreover, the entire automobile receiving structure 38 may be replaced with other conventional automobile receiving structure arrangements, if desired.

The automobile receiving structure 38 is mounted at the upper end of a piston rod 44. The piston rod 44 is received in a length of casing 46 comprising the barrel of a fluid pressure operated cylinder. The piston rod 44 extends to a piston which cooperates with the casing 46 to define a fluid pressure receiving cylinder at the lower end of the automobile lift structure 36. Whenever pressurized fluid is received in this chamber, the piston rod 44, the automobile receiving structure 38, and an automobile supported thereon are raised against the action of gravity. When the pressure is subsequently released, the piston rod 44, the automobile receiving structure 38, and an automobile supported thereon are permitted to move downwardly under the action of gravity.

It will be understood that the automobile lift structure 36 is typically utilized in a service station, or the like. In such instances, a concrete floor 48 may be provided. The concrete floor 48 includes an annular recess 50 surrounding the piston rod 44 of the automobile lift structure 36. The recess 50 receives a lower flange 52 of an upper flange 54 adapted for cooperation with the lower flange 52 to receive therebetween a packing member 56 incorporating the present invention. The upper flange 54 has an upper surface which normally extends flush with the surface of the concrete floor 48 and is secured to the lower flange by means of suitable fasteners.

The packing member 56 is constructed indentically to the packing member 10 illustrated in FIGS. 1, 2 and 3. Thus, the packing member 56 is provided with a downwardly and inwardly extending sealing lip 58 which engages the piston rod 44 to form a sliding seal therewith. As has been discussed hereinbefore, the packing member 56 is provided with a plurality of axially extending holes extending into the sealing lip from the underside thereof and positioned at substantially equally spaced points around the periphery of the sealing lip. These holes permit the sealing lip 58 to distribute itself more uniformly around the piston rod 44 and thereby permit the sealing lip 58 to form a more effective seal. The holes also reduce stress concentrations in the packing member 56 and thereby reduce wear of the packing member during use of the automobile lift structure 36. Finally, the holes permit the packing member to operate as a radial spring. This permits the packing member to accommodate a certain amount of eccentricity between the piston rod 44 and the components of the automobile lift structure which are fixed in place.

Those skilled in the art will realize that the packing member serves various important functions in the automobile lift structure 36 in addition to forming a sliding seal surrounding the piston rod 44. For example, assuming that a seal has been established between the lower flange 52 and the concrete floor 48, a fluid path exists between the lower flange 52 and the upper flange 54. However, this path is sealed by the packing member 56 which functions in this case as a gasket.

It will also be realized that packing members incorporating the present invention are adapted to various uses in addition to automobile lifts. For example, the invention is useful in conjunction with hydraulic elevators and similar apparatus. In fact, the invention may be used in cylinders employing various working fluids such as oil, water, etc.

From the foregoing, it will be understood that the present invention relates to a packing member which incorporates numerous advantages over the prior art. Perhaps most importantly, although the packing member of the present invention is relatively straightforward in design and is therefore economical to manufacture, it has been found that packing members incorporating the invention provide a more effective seal than has been possible to achieve heretofore. Another advantage relates to the fact that packing members incorporating the invention may be manufactured from various materials in order to suit the needs of particular circumstances. Still another advantage relates to the fact that packing members incorporating the invention may be provided with a layer of reinforcing material which may extend either partially around or entirely around the periphery of the packing member, thereby further adapting the packing member to the requirements of the particular application.

Although particular embodiments of the invention have been illustrated in the Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A packing member comprising an annular body of elastomeric material having a substantially radially disposed top wall, a substantially axially disposed outer wall extending downwardly from the top wall, a bottom wall including a substantially radially disposed outer portion extending inwardly from the outer wall and an angularly downwardly extending inner portion, and an inner wall extending angularly downwardly and inwardly from the top wall to the bottom wall and intersecting with the inner portion of the bottom wall to define a sealing lip at the lower inner edge of the packing member, and a plurality of holes formed in the packing member at spaced points around the inner portion of the bottom wall, all of said holes extending into the packing member substantially axially and through a substantial portion of the distance between the top and bottom walls, said holes for permitting the packing member to distribute itself more uniformly during the use of the packing member and thereby form a more effective seal, for reducing stress concentrations and thereby reducing wear, and for accommodating eccentricities between the component parts of a cylinder incorporating the packing member.

2. The packing member according to claim 1 wherein the inner wall extends angularly downwardly and inwardly from the inner edge of the top wall to the inner edge of the inner portion of the bottom wall for cooperation with the inner portion of the bottom wall to form an angularly downwardly and inwardly extending sealing lip.

3. The packing member according to claim 2 wherein the holes formed in the packing member are all substantially equal in diameter and wherein each hole is separated from the next adjacent hole by a distance equal to about one diameter.

4. The packing member according to claim 3 wherein each of the holes has a depth equal to about one-half the width between the top wall and the bottom wall.

5. The packing member according to claim 4 further including a layer of reinforcing material molded into the annular body of the elastomeric material and extending at least across the inner portion of the top wall, along the entire length of the inner wall, across the entire width of the inner portion of the bottom wall, and across at least the inner portion of the outer portion of the bottom wall.

6. A packing member comprising an annular body of elastomeric material having a substantially radially disposed top wall, a substantially axially disposed outer wall extending substantially perpendicularly to the top wall, a bottom wall including a substantially radially disposed outer portion extending substantially parallel to the top wall and an inner portion extending angularly downwardly from the inner edge of the outer portion, and an inner wall extending angularly downwardly and inwardly from the top wall to the inner edge of the inner portion of the bottom wall and intersecting with the inner portion of the bottom wall to define an angularly downwardly and inwardly extending sealing lip, and a plurality of substantially axially extending holes all formed in the packing member at substantially equally spaced points around the inner portion of the bottom wall and each having a depth equal to about one-half of the thickness of the annular body.

7. The packing member according to claim 6 further including a layer of reinforcing material molded into the annular body of elastomeric material and extending at least across the inner part of the top wall, along the entire length of the inner wall, across the entire width of the inner portion of the bottom wall, and across the inner part of the outer portion of the bottom wall.

8. The packing member according to claim 6 wherein all of the axially extending holes are substantially equal in diameter and are separated from one another by a distance of about one diameter.

9. A packing member comprising an annular body of elastomeric material having a substantially radially disposed top wall, a substantially axially disposed outer wall extending downwardly from the outer edge of the top wall and substantially perpendicularly with respect thereto, a bottom wall including a substantially radially disposed outer portion extending inwardly from the bottom edge of the outer wall substantially parallel to the top wall and an inner portion extending angularly downwardly from the inner edge of the outer portion of the bottom wall, and an inner wall extending angularly downwardly and inwardly from the inner edge of the top wall to the inner edge of the inner portion of the bottom wall and intersecting with the inner portion of the bottom wall to define an angularly downwardly and inwardly extending sealing lip, and a plurality of substantially axially extending holes all formed in the packing member at substantially equally spaced points around the inner portion of the bottom wall and each having a depth equal to about one-half the distance between the top wall and the bottom wall, said holes being substantially equal in diameter and being spaced apart by a distance equal to about one diameter, said holes for permitting the packing member to distribute itself more uniformly during use and thereby form a more effective seal for reducing stress concentrations in the packing member and thereby reducing wear, and for accommodating eccentricities between the component parts of a cylinder incorporating the packing member.

10. The packing member according to claim 9 further including a layer of reinforcing material molded into the body of elastomeric material and extending at least across the inner part of the top wall, along the entire length of the inner wall, across the entire width of the inner portion of the bottom wall, and across the inner part of the outer portion of the bottom wall.

* * * * *